Jan. 29, 1952 K. V. LYSEN 2,583,863
FISHHOOK
Filed May 21, 1947

INVENTOR.
KERMIT V. LYSEN
BY Paul, Paul & Moore
ATTORNEYS

Patented Jan. 29, 1952

2,583,863

UNITED STATES PATENT OFFICE 2,583,863

FISHHOOK

Kermit V. Lysen, Willmar, Minn.

Application May 21, 1947, Serial No. 749,405

3 Claims. (Cl. 43—44.8)

This invention relates to new and useful improvements in fish hooks and more particularly to fish hooks of the general type which require that a minnow or other bait be secured thereto when the hook is in use.

It is well known that when fishing for certain game fish such as pike, and the like, which usually seem to strike better when using minnows for bait, that difficulty is often experienced in retaining the minnow in proper position on the hook. A fish hook used for pike fishing is usually provided with a comparatively long shank to permit mounting a minnow on the shank of the hook. This is usually accomplished by inserting the barbed hook of the fish hook through the minnow's mouth and then passing it longitudinally through the minnow's body and out through its back just forwardly of the minnow's tail, whereby the minnow's body will be supported on the shank of the hook with its mouth disposed adjacent to the eye of the fish hook shank. When so positioned, the minnow has the appearance of being alive when drawn through the water, because it is retained in an upright position. It is also important that the minnow be so mounted on the hook that it cannot impart rotation thereto, which always is undesirable in that it may tend to twist the line, even though a swivel is interposed between the hook and the line, as is customary.

There is one objectionable feature in the use of conventional fish hooks of the type commonly used for pike fishing, and that is when a minnow is mounted on the shank of the hook in the usual manner, the thrust of the water against the forward end of the minnow, as the hook is drawn through the water, forces the body of the minnow rearwardly on the shank of the hook whereby the body of the minnow may become so distorted that its tail assumes an angular position to the shank of the hook, which may cause the hook and minnow to rotate about the axis of the hook shank, which obviously is objectionable.

It is therefore an object of the present invention to provide means in conjunction with the usual shank of a fish hook of the class described, whereby when a minnow is mounted on the fish hook with its head positioned adjacent to the usual eye of the fish hook shank, the minnow's body will be retained in a relatively fixed position thereon, whereby it will have the appearance of a live minnow, when drawn through the water, and also whereby it cannot slide rearwardly on the shank of the hook and cause the hook to relatively rotate when in use.

A further object of the present invention is to provide a fish hook comprising a shank provided at one end with a barbed hook, and having means at its opposite end whereby it may be conveniently attached to a fish line, and means being provided on the shank adapted to be engaged with a minnow mounted thereon for preventing relative longitudinal and rotary movements of the minnow's body on the shank of the fish hook, when the latter is in use.

A further object is to provide on a fish hook a pair of resilient bait holding members having means for securing them to the shank of the hook adjacent to the usual eye thereof, and the free ends of said members terminating at points spaced forwardly of the barbed end of the fish hook so that the barbed terminal of the fish hook may readily be projected through the body of a bait or minnow to be mounted on the shank of the hook, after which said bait holding members may be engaged with the minnow's mouth to thereby prevent the minnow's body from sliding rearwardly on the shank of the hook, when the baited hook is drawn through the water.

A further object is to provide a fish hook comprising an elongated shank having a barbed hook at one end and means at its opposite end for attaching it to a fish line, and a resilient bait holding member being secured to said shank and extending outwardly and rearwardly therefrom adapted to be received in the mouth of a minnow supported on the shank of the hook, thereby to prevent relative longitudinal and rotary movements of the minnow on said shank.

Other objects of the invention reside in the simple and inexpensive manner of forming the bait holding members and securing them to the forward end of the shank of the fish hook, whereby they may readily be inwardly flexed for insertion in the mouth of a minnow supported on the shank of a fish hook; in the manner of forming the bait holding members from a single strand of resilient wire coiled about the shank of the fish hook adjacent to the usual eye thereof and passing through said eye whereby the bait holding members are secured in fixed relation on the shank; and in the provision of a fish hook comprising an elongated shank adapted to be inserted through the body of a minnow and having a resilient bait holding member secured to the front end thereof adjacent to the usual eye of the fish hook for retaining the minnow in position upon the shank.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
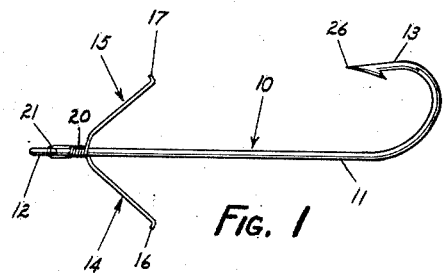
Figure 1 is a side elevational view of a fish hook constructed in accordance with the invention herein disclosed.

In the selected embodiment of the invention herein disclosed, there is illustrated in Figure 1, for purposes of disclosure, a fish hook, generally designated by the numeral 10, and which may be of more or less conventional design. It comprises an elongated shank 11 provided at one end with a barbed hook 13, and its opposite or forward end is shown provided with the usual eye 12, as is characteristic of devices of this general type. The hook shown in Figure 1 is of the type well known to fishermen as a pike hook, the shank being sufficiently long to permit a minnow F to be mounted thereon by passing the barbed hook through the mouth of the minnow and then lengthwise through its body and bringing the barb 13 out through the top of the minnow's body just forwardly of the minnow's tail, as clearly illustrated in Figure 2.

When a minnow is so mounted on a fish hook, there is always a tendency for the body of the minnow to slip rearwardly on the shank of the hook as a result of the thrust of the water against the front end of the minnow, whereby the body of the minnow is forced downwardly against the barbed end of the hook and there has a tendency to double up more or less which may cause undesirable effects of the hook in the water. When the body of a minnow is thus forced against the barbed hook 13, the minnow's tail may project laterally from the axis of the hook shank, whereby the hook and minnow may rotate in the water which obviously is not desirable.

An important feature of the present invention therefore is to provide in combination with a hook of this type, means for positively preventing the body of the minnow from sliding rearwardly on the shank of the hook when the hook with a minnow mounted thereon is drawn through the water.

The means provided for thus securing the minnow in substantially fixed position upon the shank of the hook is shown comprising one or more resilient bait holding members, generally designated by the numerals 14 and 15. These may be formed from relatively stiff resilient wire, and in the present instance the members 14 and 15 are shown made integral, one with the other. The bait holding members 14 and 15 are provided with relatively small outwardly turned terminal bills 16 and 17, respectively, which are adapted to engage the bottom and top of the interior of a minnow's mouth, when inserted therein, as shown in Figure 2, thereby to secure the minnow's body in position upon the shank, whereby it cannot slide rearwardly thereon, as hereinbefore mentioned.

Figure 2:
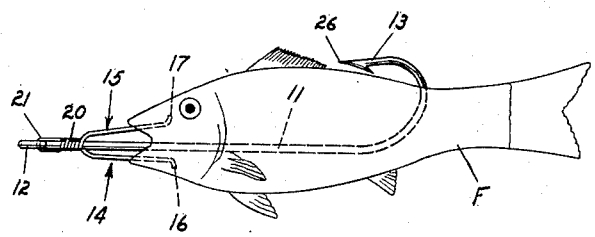
Figure 2 is a side elevation of the hook showing a minnow mounted thereon.
Figure 4:
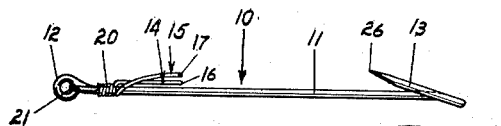
Figure 4 is a top view of Figure 1.

The bait holding members 14 and 15 are of such length that when the body of the hook is inserted through the body of a minnow, and the minnow is forced rearwardly against the barbed hook 13 of the shank, the bait holding members 14 and 15 may be pressed together with the fingers to permit them to readily enter the minnow's mouth, after which the body of the minnow will be slid forwardly on the shank, as will be understood by reference to Figure 2. When the members 14 and 15 are then released, they will engage the bottom and top walls of the minnow's mouth and firmly hold the minnow in fixed position on the hook shank, thereby preventing relative longitudinal and rotary movements of the minnow's body on the shank of the hook, as will readily be understood.

Figure 3:
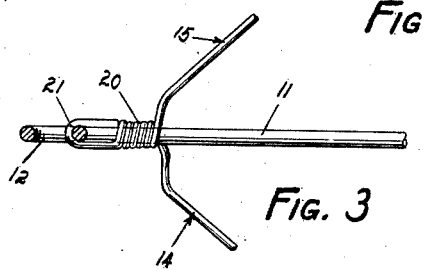
Figure 3 is a detail sectional view on a larger scale, showing the preferred manner of attaching the bait holding members to the shank of the hook.

It is essential, of course, that the bait holding members 14 and 15 be fixedly secured to the shank 11 of the hook whereby they cannot relatively rotate thereon. This may readily and conveniently be accomplished by twisting the wire from which the members 14 and 15 are made, around the shank of the hook as shown at 20 in Figure 3, and also threading the wire through the eye 12 of the shank, as shown at 21. When the members 14 and 15 are thus secured to the shank of the fish hook, they become firmly secured thereto.

The bait holding members 14 and 15 normally extend outwardly and rearwardly from their point of securement with the shank 11 of the hook, and are preferably disposed in the median plane to the barbed hook 13, thereby to properly engage a minnow secured to the hook shank, as shown in Figure 2. In the drawing, the bait holding members 14 and 15 are shown as being formed of an integral piece of wire twisted about the shank and threaded through the eye 12 of the shank. Obviously, they may be otherwise secured to the shank provided they are fixedly secured thereto so that they may be retained in their proper positions with respect to the barbed hook 13. They must also be so fixed to the forward end of the shank 11 of the fish hook that when a large game fish strikes the baited hook, the members 14 and 15 are not likely to become disengaged from the forward end of the shank 11.

The bills or sharpened terminals 16 and 17, of the bait holding members 14 and 15, respectively, are preferably pointed and are not provided with barbs, this being deemed unnecessary, as the members 14 and 15 are formed of relatively thin resilient wire having sufficient tension to engage the walls of the fish's mouth with sufficient grip to prevent them from becoming detached therefrom.

In the use of the improved fish hook herein disclosed the barbed hook is inserted through the mouth of the minnow F and is then extended lengthwise through the minnow's body for a suitable distance sufficient to permit the bait holding members 14 and 15 to be positioned within the minnow's mouth, as shown in Figure 2, and as hereinbefore described. This operation is comparatively simple and when the members 14 and 15 are inserted into the minnow's mouth and released, the resiliency of the material from which they are made will cause the bills 16 and 17 thereof to engage the walls of the minnow's mouth in such a manner that the position of the minnow on the shank of the hook is not likely to be changed, even though game fish may viciously strike the bait. It will also be noted that the minnow will always be held in a vertical position, when drawn through the water, which adds to the attractiveness thereof.

If it is desired to mount the minnow on the hook with the barbed end 13 of the hook projecting through the side of the minnow's body, then the bills of the bait holding members 14 and 15 may be supported in a substantially horizontal position with respect to the position of the minnow in the water in which case they may project outwardly through the openings provided at the rear of the minnow's gills. It is not necessary, however, that the bait holding members 14 and 15 have their bill portions 16 and 17 engage the minnow's body rearwardly of the gills, as the bait holding members are rearwardly directed, and when released, will spread apart due to their inherent resiliency and will thereby dig into the flesh of the minnow to firmly support the minnow on the shank of the hook.

In the drawing it will be noted that the bait holding members 14 and 15 are shown positioned in the plane of the barbed hook 13 of the device. Obviously, they may be otherwise positioned without departing from the scope of the invention.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A fish hook comprising a suitable shank terminating at the rear end in a barbed point, said shank being of such length as to receive a minnow as bait thereon when the barbed end of the hook is threaded into the mouth of the minnow, through the body thereof and out through the rear back portion of the minnow, a pair of yieldable elongated bait holding members extending outwardly in opposite directions and from opposite sides of the shank and forming an angle facing the barbed end of the hook, said members being of such length as to extend only into the mouth of the minnow to engage with the top and bottom thereof and being disposed substantially in planes intersecting the plane of the barbed end of the hook, and said yieldable elongated bait holding members each have a terminal end extending outwardly therefrom at substantially a right angle to the adjacent portions of its respective bait holding member to cause them to engage the top and bottom of the mouth of the minnow with a gripping action, whereby the minnow is retained in a relatively fixed position upon the hook.

2. A fish hook comprising a suitable shank terminating at one end in a barbed point and having an eye at its opposite end, said shank being of such length as to receive a minnow as bait thereon when the barbed end of the hook is threaded into the mouth of the minnow, through the body thereof and out through the rear back portion of the minnow, a pair of elongated bait holding members extending outwardly in opposite directions and from opposite sides of the shank and forming an angle facing the barbed end of the hook and lying in planes intersecting the plane of the barbed end of the hook, said members being formed of an integral strand of wire having its intermediate portion passing through said eye and coiled about the shank adjacent the eye whereby said members are fixedly secured to the shank, said members being of such length as to extend only into the mouth of the minnow to engage with the top and bottom thereof, and said members being formed with sharpened bills directed outwardly from the shank and adapted to engage the top and bottom walls of the mouth of the minnow, whereby the minnow is secured on the hook against relative longitudinal and axial movement on the shank of the hook.

3. A fish hook comprising a suitable shank terminating at the rear end in a barbed point, said shank being of such length as to receive a minnow as bait thereon when the barbed end of the hook is threaded into the mouth of the minnow, through the body thereof and out through the rear back portion of the minnow and a pair of elongated bait holding members attached to the front end of the shank and extending generally in a direction toward the barbed end of the hook in spaced relation thereto and when inserted into the minnow engaging upper and lower internal portions of the minnow, said yieldable elongated bait holding members each having a terminal end extending outwardly therefrom at substantially a right angle to the adjacent portions of its respective bait holding member to cause them to engage the top and bottom of the internal portions of the minnow with a gripping action, whereby the minnow is retained in a relatively fixed position upon the hook.

KERMIT V. LYSEN.

REFERENCES CITED

The following references are of record in the file of this patent:

UNITED STATES PATENTS

| Number | Name | Date |
| --- | --- | --- |
| 551,582 | Crane | Dec. 17, 1895 |
| 797,281 | Henzel | Aug. 15, 1905 |
| 805,284 | Greenway et al. | Nov. 21, 1905 |
| 823,319 | Cooper | June 12, 1906 |
| 831,552 | Hallstrom | Sept. 25, 1906 |
| 1,620,589 | Ackerman | Mar. 8, 1927 |
| 1,863,544 | Prouse | June 14, 1932 |
| 2,148,074 | Kaspeck | Feb. 21, 1939 |
| 2,168,716 | Reece | Aug. 8, 1939 |